US011734042B2

(12) United States Patent
Das

(10) Patent No.: US 11,734,042 B2
(45) Date of Patent: Aug. 22, 2023

(54) PROVIDING SUPPLEMENTAL INFORMATION TO A GUEST OPERATING SYSTEM BY A HYPERVISOR

(71) Applicant: Red Hat, Inc., Raleigh, NC (US)

(72) Inventor: Bandan Das, Westford, MA (US)

(73) Assignee: Red Hat, Inc., Raleigh, NC (US)

(*) Notice: Subject to any disclaimer, the term of this patent is extended or adjusted under 35 U.S.C. 154(b) by 331 days.

(21) Appl. No.: 17/117,991

(22) Filed: Dec. 10, 2020

(65) Prior Publication Data
US 2022/0188136 A1 Jun. 16, 2022

(51) Int. Cl.
G06F 9/455 (2018.01)
G06F 9/54 (2006.01)
G06F 13/16 (2006.01)
G06F 12/06 (2006.01)

(52) U.S. Cl.
CPC .......... G06F 9/45558 (2013.01); G06F 9/544 (2013.01); G06F 12/0646 (2013.01); G06F 13/1689 (2013.01); G06F 2009/45583 (2013.01); G06F 2212/1044 (2013.01)

(58) Field of Classification Search
None
See application file for complete search history.

(56) References Cited

U.S. PATENT DOCUMENTS

| 9,619,346 B2 | 4/2017 | Pape | |
|---|---|---|---|
| 9,727,368 B1* | 8/2017 | Tsirkin | G06F 9/45545 |
| 10,033,759 B1* | 7/2018 | Kabra | G06F 21/629 |
| 10,116,630 B2 | 10/2018 | Caragea | |
| 10,169,088 B2* | 1/2019 | Tsirkin | G06F 9/45558 |
| 10,243,746 B2* | 3/2019 | Tsirkin | G06F 9/45558 |
| 10,496,425 B2* | 12/2019 | Tsirkin | G06F 21/53 |
| 10,514,945 B2* | 12/2019 | Dabak | G06F 21/629 |

* cited by examiner

Primary Examiner — Van H Nguyen
(74) Attorney, Agent, or Firm — Red Hat, Inc.

(57) ABSTRACT

Providing supplemental information to a guest operating system by a hypervisor is disclosed. A hypervisor executing on a host computing device initiates a virtual machine comprising a guest kernel. The hypervisor determines an address of a shared memory area that is accessible by the guest kernel and accessible by the hypervisor. The hypervisor determines that an event has occurred for which supplemental information exists, the event corresponding to a particular event code of a plurality of different event codes. The hypervisor determines a location in the shared memory area that corresponds to the particular event code. The hypervisor inserts the supplemental information at the location in the shared memory area. The hypervisor causes an interrupt of the guest kernel.

18 Claims, 9 Drawing Sheets

PROVIDING SUPPLEMENTAL INFORMATION TO A GUEST OPERATING SYSTEM BY A HYPERVISOR

BACKGROUND

Virtualization technologies, such as virtual machine (VM) technologies, are increasingly popular because they allow more efficient utilization of a host computing device by allowing multiple isolated computing environments to run on a single host computing device. A virtual machine monitor, sometimes referred to herein as a hypervisor, executes between the "bare metal" of the host computing device, i.e., the processor cores and the memory of the host computing device and the VMs, and manages and otherwise coordinates access to the processor cores and the memory by the VMs running on the host computing device. VMs are widely used by cloud computing providers that provide on-demand computing services to multiple tenants (i.e., customers).

SUMMARY

The examples disclosed herein implement mechanisms for providing supplemental information to a guest kernel by a hypervisor. The guest kernel may be programmed to utilize such supplemental information in a manner that allows the guest kernel to implement additional features or different behavior than if the guest kernel were not provided such supplemental information.

In one example a method is provided. The method includes initiating, by a hypervisor executing on a host computing device, a virtual machine comprising a guest kernel. The method further includes determining, by the hypervisor, an address of a shared memory area that is accessible by the guest kernel. The method further includes determining, by the hypervisor, that an event has occurred for which supplemental information exists, the event corresponding to a particular event code of a plurality of different event codes. The method further includes determining a location in the shared memory area that corresponds to the particular event code. The method further includes inserting the supplemental information at the location in the shared memory area. The method further includes causing, by the hypervisor, an interrupt of the guest kernel.

In another example a host computing device is provided. The host computing device includes a memory and a processor device coupled to the memory. The processor device is to initiate, by a hypervisor, a virtual machine comprising a guest kernel. The processor device is further to determine, by the hypervisor, an address of a shared memory area that is accessible by the guest kernel. The processor device is further to determine, by the hypervisor, that an event has occurred for which supplemental information exists, the event corresponding to a particular event code. The processor device is further to determine a location in the shared memory area that corresponds to the particular event code. The processor device is further to insert the supplemental information at the location in the shared memory area. The processor device is further to cause, by the hypervisor, an interrupt of the guest kernel.

In another example a non-transitory computer-readable storage medium is provided. The non-transitory computer-readable storage medium includes executable instructions to cause a processor device to initiate, by a hypervisor, a virtual machine comprising a guest kernel. The instructions further cause the processor device to determine, by the hypervisor, an address of a shared memory area that is accessible by the guest kernel. The instructions further cause the processor device to determine, by the hypervisor, that an event has occurred for which supplemental information exists, the event corresponding to a particular event code. The instructions further cause the processor device to determine a location in the shared memory area that corresponds to the particular event code. The instructions further cause the processor device to insert the supplemental information at the location in the shared memory area. The instructions further cause the processor device to cause, by the hypervisor, an interrupt of the guest kernel.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
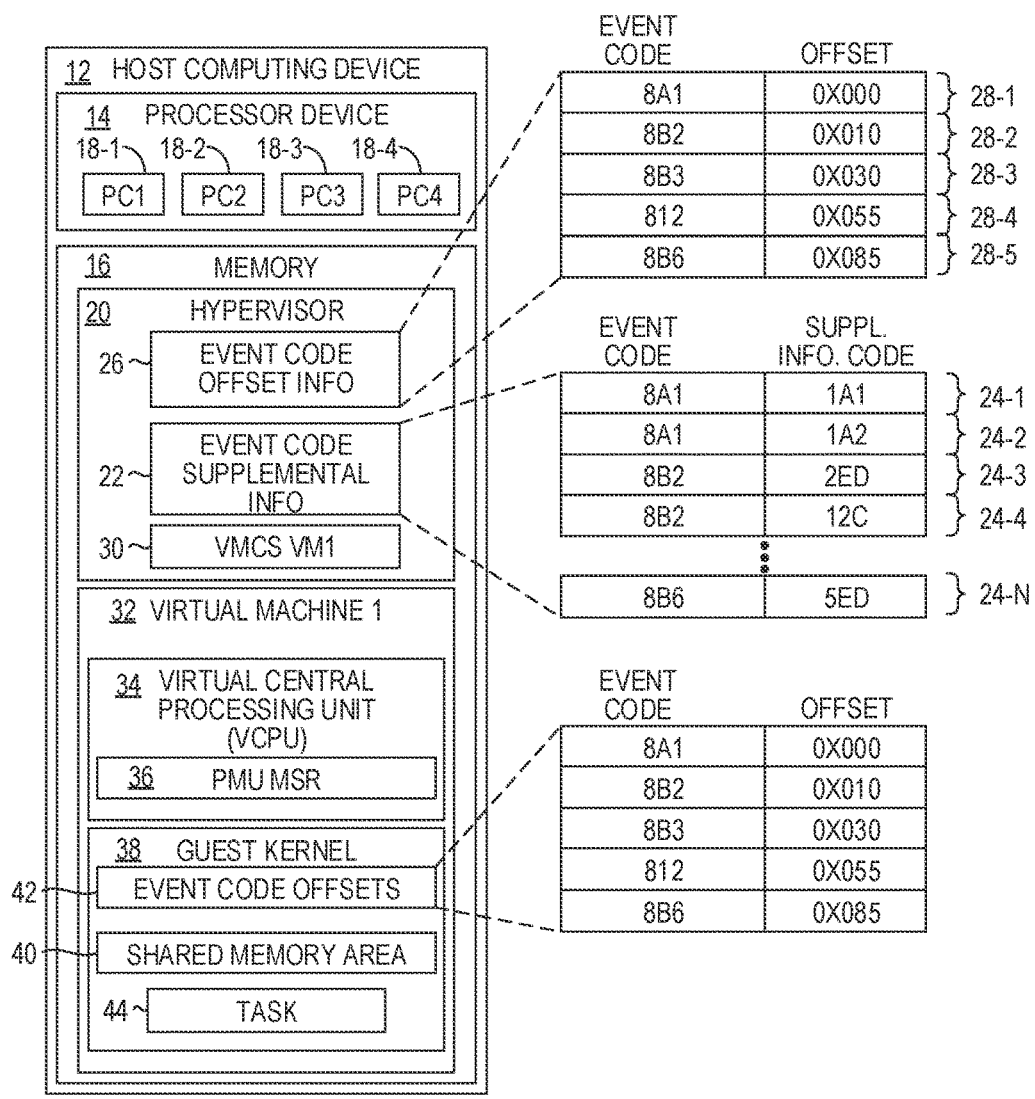
FIG. 1 is a block diagram of an environment in which a hypervisor may provide supplemental information to a guest operating system according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

Virtualization technologies, such as virtual machine (VM) technologies, are increasingly popular because they allow more efficient utilization of a host computing device by allowing multiple isolated computing environments to run on a single host computing device. A virtual machine monitor, sometimes referred to herein as a hypervisor, executes between the "bare metal" of the host computing device, i.e., the processor cores and the memory of the host computing device and the VMs, and manages and otherwise coordinates access to the processor cores and the memory by the VMs running on the host computing device. VMs are widely used by cloud computing providers that provide on-demand computing services to multiple tenants (i.e., customers).

Each VM includes a guest kernel, sometimes referred to as a guest operating system. The VM is often prevented from accessing information about a host computing device by the hypervisor. The hypervisor controls the VMs, and is automatically invoked in response to certain events of the guest kernel or a guest application, such as an exception or interrupt. The hypervisor may then examine the reason for the automatic invocation and perform some action before returning control to the guest kernel. As an example, a guest kernel may attempt some action, such as accessing a non-existent port. The attempted access of the non-existent port may result in an exception or interrupt, which causes control to automatically transfer to the hypervisor. The hypervisor may then determine the reason for the transfer of control, and decide to simply return the exception code to the guest kernel, or implement some other action. Often the exception codes are relatively generic and do not provide much information to the guest kernel. For instance, a wide variety of exceptions may be designated as a general protection fault (GPF). The guest kernel may have no way of knowing precisely what caused the GPF, for example, if the attempt to access the port was incorrectly formatted or otherwise defective, whether the port is busy, whether there is no port, or the like. Moreover, different hypervisors treat different exceptions differently, and a guest kernel may be unaware of exactly how a hypervisor is handling any particular exception. If the guest kernel had supplemental information regarding such exceptions, the guest kernel may be programmed to perform different actions depending on the precise reason for the exception.

There are events that occur on a host computing device that may be useful to a guest kernel if the guest kernel were aware of such events. As an example, a host computing device may have multiple processor cores. A VM may have a number of periodic tasks that are executed by the guest kernel at various times. If a processor core were idle, it may be beneficial for the guest kernel to be aware of this so that the guest kernel might initiate a periodic task to utilize the idle processor core that might otherwise be initiated when all the processor cores are busy.

The examples disclosed herein implement mechanisms for providing supplemental information to a guest kernel by a hypervisor. The guest kernel may be programmed to utilize such supplemental information in a manner that allows the guest kernel to implement additional features or different behavior than if the guest kernel were not provided such supplemental information.

Upon initiation, a guest kernel determines whether the hypervisor offers a supplemental information feature. If so, the guest kernel allocates a shared memory area that is accessible to the guest kernel and the hypervisor. The hypervisor subsequently determines that an event has occurred for which supplemental information exists, and stores the supplemental information at a location in the shared memory area. The hypervisor causes an interrupt of the guest kernel that includes an event code that corresponds to the event. The guest kernel accesses the event code and, based on the event code, accesses the location in the shared memory area to obtain the supplemental information.

FIG. 1 is a block diagram of an environment 10 in which examples disclosed herein can be implemented. In some implementations, the environment 10 may be a cloud computing environment, but the examples disclosed herein are not limited to a cloud computing environment. The environment 10 includes a host computing device 12, which in turn includes a processor device 14 and a memory 16. The processor device 14 comprises four processor cores 18-1-18-4 (PC1, PC2, PC3, and PC4, respectively.) The processor device 14 may comprise any suitable processor device, such as, by way of non-limiting example, Intel® processor devices and AMD® processor devices.

A virtual machine monitor, referred to herein as a hypervisor 20, implements a virtualized environment via VM virtualization technology on the host computing device 12. The VM virtualization technology may comprise, by way of non-limiting example, Red Hat® Enterprise Linux® virtualization technology, VMware® virtualization technology, Microsoft® Hyper-V virtualization technology, Oracle® VM Server for SPARC virtualization technology, or the like.

It will be noted that because the hypervisor 20 is a component of the host computing device 12, functionality implemented by the hypervisor 20 may be attributed to the host computing device 12 generally. Moreover, because the hypervisor 20 comprises software instructions that program the processor device 14 to carry out functionality discussed herein, functionality implemented by the hypervisor 20 may be attributed herein to the processor device 14.

The hypervisor 20 implements a supplemental information feature wherein, upon the occurrence of certain events, as described in greater detail below, the hypervisor 20 may share supplemental information regarding the event with one or more guest kernels executing in corresponding VMs on the host computing device 12. The hypervisor 20 includes event code supplemental information 22 that identifies a plurality of event code correspondence entries 24-1-24-N, each of which identifies an event code and a corresponding supplemental information code. The term "supplemental information" as used herein refers to information that is in addition to an event code received by a guest kernel when the hypervisor causes an interrupt of the guest kernel.

As illustrated by event code correspondence entries 24-1, 24-2, a single event code (e.g. event code 8A1) may correspond to multiple supplemental information codes (e.g. supplemental information codes 1A1 and 1A2), one of which may be provided to a guest kernel by the hypervisor 20 depending on the particular circumstances regarding the event code 8A1. While for purposes of illustration and explanation the correspondence between event codes and supplemental information codes are illustrated as a data structure, the correspondence may be known to the hypervisor 20 via other mechanisms, such as by hard-coding the correspondence in the hypervisor 20, or the like. It should be noted that the event codes and the supplemental information codes are values, but correspond to some meaning, in accordance with a known protocol. For example, an event code 826 may mean a general protection fault, and a supplemental information code 1A8 may mean that a particular port does not exist on the host computing device.

The hypervisor 20 also includes event code offset information 26 comprising a plurality of event code offset entries 28-1-28-5 (generally, event code offset entries 28). Each event code offset entry 28 identifies, for a particular event code, an offset in a memory area where a corresponding supplemental information code can be inserted by the hypervisor 20 and retrieved by a guest kernel. Again, while for purposes of illustration and explanation the event code offset information 26 is illustrated as a data structure, the event code offset information 26 may be known to the hypervisor 20 via other mechanisms, such as by hard-coding the event code offset information 26 in the hypervisor 20, or the like. While for purposes of illustration only five event codes are shown, in practice, there may be any number of event codes for which supplemental information may be provided, such as tens or hundreds of different event codes.

For purposes of illustration, assume that the hypervisor 20 receives a request to initiate a VM on the host computing device 12. The request may be programmatic, such as from a scheduler task or a task that has determined that an additional VM should be initiated in response to an increased demand. Alternatively, the request may be initiated manually by an operator via a VM user interface (not illustrated). As part of the initiation of a VM, the hypervisor 20 typically configures a virtual machine control structure (VMCS) 30 for each virtual CPU (VCPU) of the VM that defines events that will cause a VM exit (VMEXIT) from the VM to the hypervisor 20, such as interrupts from external devices, or the execution of certain processor instructions, such as execution of an x86 MONITOR instruction, an x86 WAIT instruction, and an x86 HLT instruction, if attempted by the guest kernel or a task executing in the VM. A VMEXIT is an immediate transfer of control from a task to the hypervisor 20, which occurs in response to an event identified in the VMCS 30. In some processor architectures, such as an Intel® processor architecture, a VMCS is referred to as a VMCS. In other processor architectures, such as an AMD® processor architecture, a VMCS is referred to as a virtual machine control block (VMCB). The examples disclosed herein are not limited to any particular processor architecture and have applicability to any processor architecture that implements virtualization via one or more data structures that control VMEXIT behavior.

The hypervisor 20 then initiates a VM 32 that is associated with the VMCS 30. The hypervisor 20 associates a virtual central processing unit (VCPU) 34 with the VM 32. If the VM 32 has multiple VCPUs, the hypervisor 20 generates a separate VMCS for each VCPU. The VCPU 34 has associated information and registers, including, by way of non-limiting example, a performance monitoring unit (PMU) model specific register (MSR) 36. The VM 32 includes a guest kernel 38. The guest kernel 38 determines that the hypervisor 20 provides a supplemental information feature that provides supplemental information about some event on the host computing device 12. The guest kernel 38 may make this determination in any number of ways. In some implementations, the guest kernel 38 may make a hypercall to the hypervisor 20 to request whether the hypervisor 20 provides the supplemental information feature. In some implementations, the hypervisor 20 may store a value, such as a 1, in a predetermined memory location accessible to the guest kernel 38 that indicates that the hypervisor 20 offers the supplemental information feature. The predetermined memory location may comprise a particular register that, by convention, the guest kernel 38 knows will identify whether the hypervisor 20 offers the supplemental information feature. In some implementations, the guest kernel 38 may invoke a system function, such as CPUID, to determine whether the hypervisor 20 offers the supplemental information feature.

In response to determining that the hypervisor 20 provides the supplemental information feature, the guest kernel 38 allocates a shared memory area 40 that is accessible to the hypervisor 20. In some implementations, the shared memory area 40 may comprise a memory page (e.g., 4096 bytes). In some implementations, the guest kernel 38 provides the location of the shared memory area 40 to the hypervisor 20. For example, the guest kernel 38 may store a memory address of the shared memory area 40 in a predetermined memory location, such as a register or the like. In some implementations, the shared memory area 40 may be located at a predetermined memory location by convention, and thus the guest kernel 38 need not provide the location of the shared memory area 40 to the hypervisor 20.

For purposes of illustration, assume that the hypervisor 20 determines that an event has occurred for which supplemental information exists. The hypervisor 20 determines an event code for the event. Two examples of types of events for which supplemental information may exist include a transfer of control from the VM 32 to the hypervisor 20 in response to an exception or interrupt of the guest kernel 38 or some other task in the VM 32, and a particular condition of the host computing device 12.

Where the event comprises a transfer of control from the VM 32 to the hypervisor 20, the hypervisor 20 determines the event code based on the exception event code that caused the transfer of control, such as an invalid operand, a general protection fault, or the like. The exception event code may be in the VMCS 30 for example. The hypervisor 20 may then access the event code supplemental information 22 which correlates the plurality of event codes to corresponding supplemental information and determine that supplemental information regarding the event code exists.

By protocol, a predetermined event code may be used for events relating to conditions of the host computing device 12. Depending on the particular event, the hypervisor 20 then determines supplemental information in the form of a particular supplemental condition code. For example, if the condition of the host is an idle processor, a particular supplemental condition code will be selected that identifies the idle processor condition.

The hypervisor 20 accesses the event code offset information 26 that correlates the plurality of event codes to a corresponding plurality of offset values to determine a particular offset value for the event code. The hypervisor 20 adds the offset value that corresponds to the event code to a memory address of the starting location of the shared memory area 40. The hypervisor 20 then inserts the supplemental information at that location in the shared memory area 40. The hypervisor 20 also, if necessary, inserts the particular event code into the VMCS 30 and causes an interrupt of the guest kernel 38. In particular, the hypervisor 20 causes the processor device 14 to return control to the guest kernel 38, which, because of the event code in the VMCS 30, is interrupted and immediately jumps to an exception handler. The exception handler analyzes the event code in the VMCS. Where the event was a transfer of control from the guest kernel 38 to the hypervisor 20 due to an exception, the particular event code comprises the exception event code. Where the event comprises a condition of the host computing device 12, the particular event code comprises the predetermined event code designated to correspond to events relating to a condition of the host computing device 12.

The guest kernel 38 analyzes the VMCS 30 to determine the exception code associated with the exception. In the case where the event was a transfer of control from the guest kernel 38 to the hypervisor 20, the exception code is the exception code that caused the transfer of control. In the case where the event relates to a condition of the host computing device 12, the exception code comprises the predetermined event code designated to correspond to events relating to a condition of the host computing device 12.

The guest kernel 38 also has the event code offset information 42 that correlates the exception codes to a corresponding plurality of offset values. The guest kernel 38 accesses the event code offset information 42 using the exception code to determine a particular offset that corresponds to the exception code. The guest kernel 38 may then access the appropriate location in the shared memory area 40 by adding the offset value to a memory address of the starting location of the shared memory area 40 and thereby access the supplemental information provided by the hypervisor 20 relating to the event. After accessing the supplemental information, the guest kernel 38 may clear the supplemental information from the shared memory area 40.

Some specific examples of providing supplemental information to a guest operating system by a hypervisor will now be provided. In a first example, the guest kernel 38 attempts to access a particular PMU MSR that is not, in fact, exposed to the guest kernel 38. How PMU MSRs are exposed and which PMU MSRs are exposed to a guest kernel 38 can differ across different hypervisors. How hypervisors handle an attempt to access a PMU MSR that is not exposed can differ also. One hypervisor may simply ignore the attempt and return control to the guest kernel 38 without an exception such that the guest kernel 38 is not made specifically aware that the PMU MSR is not exposed to the guest kernel 38. Another hypervisor may terminate the guest kernel 38.

In this example, the attempt to access the PMU MSR results in a general protection fault exception and a VMEXIT and immediate transfer of control to the hypervisor 20. The hypervisor 20 analyzes the general protection fault exception code associated with the immediate transfer of control from the guest kernel 38 to the hypervisor 20 and related information to determine that the guest kernel 38 attempted to access a PMU MSR that is not exposed to the guest kernel 38. Rather than simply ignore the attempt to access the PMU MSR and return control to the guest kernel 38, simply terminate the guest kernel 38, or simply return a general protection exception fault code to the guest kernel 38, the hypervisor 20 accesses the event code supplemental information 22 and selects a supplemental information code that provides more specific information, in particular, that the PMU MSR is not exposed to the guest kernel 38. The hypervisor 20 then accesses the event code offset information 26 to determine the appropriate location in the shared memory area 40, and inserts at the appropriate location the supplemental information code. The hypervisor 20 then causes an interrupt of the guest kernel 38, which includes the exception code originally generated in response to the guest kernel 38 attempting to access the PMU MSR.

The guest kernel 38 determines that the guest kernel 38 has had an exception. The guest kernel 38 accesses the exception code, and the event code offset information 26 to determine a location in the shared memory area 40 of the supplemental information. The guest kernel 38 accesses the shared memory area 40 at the appropriate location and retrieves the supplemental information provided by the hypervisor 20. Based on the supplemental information, the guest kernel 38 becomes aware that the PMU MSR is not exposed to the guest kernel 38, and inhibits subsequent attempts to access the PMU MSR to thereby eliminate future general protection faults and subsequent exception handling by the hypervisor 20.

In a second example, the guest kernel 38 attempts to access a port that does not exist on the host computing device 12. The attempt to access the port results in a VMEXIT and an immediate transfer of control to the hypervisor 20. The hypervisor 20 analyzes the exception code associated with the immediate transfer of control from the guest kernel 38 to the hypervisor 20 and related information to determine that the guest kernel 38 attempted to access a port on the host computing device 12 that does not exist. Rather than simply ignore the attempt to access the port and return control to the guest kernel 38, or, alternatively, simply terminate the guest kernel 38, the hypervisor 20 accesses the event code supplemental information 22 and selects a supplemental information code that provides more specific information, in particular, that the port does not exist on the host computing device 12. The hypervisor 20 then accesses the event code offset information 26 to determine the appropriate location in the shared memory area 40, and inserts at the appropriate location the supplemental information code. The hypervisor 20 then causes an interrupt of the guest kernel 38, which includes the exception code originally generated in response to the guest kernel 38 attempting to access the port.

The guest kernel 38 determines that the guest kernel 38 has had an exception. The guest kernel 38 accesses the exception code and the event code offset information 26 to determine a location in the shared memory area 40 of the supplemental information. The guest kernel 38 accesses the shared memory area 40 at the appropriate location and retrieves the supplemental information provided by the hypervisor 20. Based on the supplemental information, the guest kernel 38 becomes aware that the port does not exist on the host computing device 12, and inhibits subsequent attempts to access the port.

In a third example, the guest kernel 38 attempts to execute a power saving instruction, such as MONITOR and/or MWAIT power saving instructions. For the sake of compatibility, some hypervisors implement NOPs (no operation) for power saving instructions such as MONITOR and/or MWAIT. In this example, a first attempt by the guest kernel 38 to execute a MONITOR and/or MWAIT power saving instruction results in an exception and a VMEXIT and immediate transfer of control to the hypervisor 20. The hypervisor 20 analyzes the exception code associated with the immediate transfer of control from the guest kernel 38 to the hypervisor 20 and related information to determine that the guest kernel 38 attempted to execute a MONITOR and/or MWAIT power saving instruction. Rather than simply ignore the attempt to execute a MONITOR and/or MWAIT power saving instruction (i.e., treat the instruction as a NOP), the hypervisor 20 accesses the event code supplemental information 22 and selects a supplemental information code that provides more specific information, in particular, that the MWAIT and MONITOR instructions will be treated as NOPs. The hypervisor 20 then accesses the event code offset information 26 to determine the appropriate location in the shared memory area 40, and inserts at the appropriate location the supplemental information code. The hypervisor 20 then causes an interrupt of the guest kernel 38 which includes the exception code originally generated in response to the guest kernel 38 attempting to execute a MONITOR and/or MWAIT power saving instruction.

The guest kernel 38 determines that the guest kernel 38 has had an exception. The guest kernel 38 accesses the exception code and the event code offset information 26 to determine a location in the shared memory area 40 of the supplemental information. The guest kernel 38 accesses the shared memory area 40 at the appropriate location and retrieves the supplemental information provided by the hypervisor 20. Based on the supplemental information, the guest kernel 38 becomes aware that MWAIT and MONITOR instructions will be treated as NOPs. The guest kernel 38, in response, subsequently uses PAUSE and HALT instructions in lieu of MWAIT and MONITOR instructions.

In a fourth example, the hypervisor 20 determines that a condition of the host computing device 12 exists. In this example, the condition is that the processor core 18-4 is idle. The hypervisor 20 selects a supplemental information code that indicates that a processor core 18 of the host computing device 12 is idle. The hypervisor 20 then accesses the event code offset information 26 to determine the appropriate location in the shared memory area 40 in which to store supplemental information relating to conditions of the host computing device 12, and inserts at the appropriate location the supplemental information code. The hypervisor 20 then inserts in the VMCS 30 the predetermined exception code that corresponds to a host computing device condition. The hypervisor 20 causes an interrupt of the guest kernel 38. In some embodiments, the hypervisor 20 may perform an inter-processor interrupt (IPI) of the processor device 14 executing the guest kernel 38. The IPI causes the processor device 14 to transfer control to the hypervisor 20. The hypervisor 20 is aware of the reason of the transfer of control and returns control to the guest kernel 38. The guest kernel 38, because of the predetermined exception code in the VMCS 30, immediately jumps to an exception handler component of the guest kernel 38. The exception handler accesses the predetermined exception code and the event code offset information 26 to determine a location in the shared memory area 40 of the supplemental information. The guest kernel 38 accesses the shared memory area 40 at the appropriate location and retrieves the supplemental information provided by the hypervisor 20. Based on the supplemental information, the guest kernel 38 initiates a periodic task 44 to take advantage of the idle processor core 18.

In a fifth example, the hypervisor 20 determines that a condition of the host computing device 12 exists. In this example, the condition is that the host computing device 12 is shutting down. The hypervisor 20 selects a supplemental information code that indicates that the host computing device 12 is shutting down. The hypervisor 20 then accesses the event code offset information 26 to determine the appropriate location in the shared memory area 40 in which to store supplemental information relating to conditions of the host computing device 12, and inserts at the appropriate location the supplemental information code. The hypervisor 20 then causes an interrupt of the guest kernel 38 as discussed above with regard to the fourth example. The guest kernel 38, because of the predetermined exception code in the VMCS 30, immediately jumps to an exception handler component of the guest kernel 38. The exception handler accesses the predetermined exception code and the event code offset information 26 to determine a location in the shared memory area 40 of the supplemental information. Based on the supplemental information, the guest kernel 38 sends instructions to each of the tasks executing in the guest kernel 38 to shut down.

It is noted that because the guest kernel 38 is a component of the host computing device 12, functionality implemented by the guest kernel 38 may be attributed to the host computing device 12 generally. Moreover, because the guest kernel 38 comprises software instructions that program the processor device 14 to carry out functionality discussed herein, functionality implemented by the guest kernel 38 may be attributed herein to the processor device 14.

Figure 2:
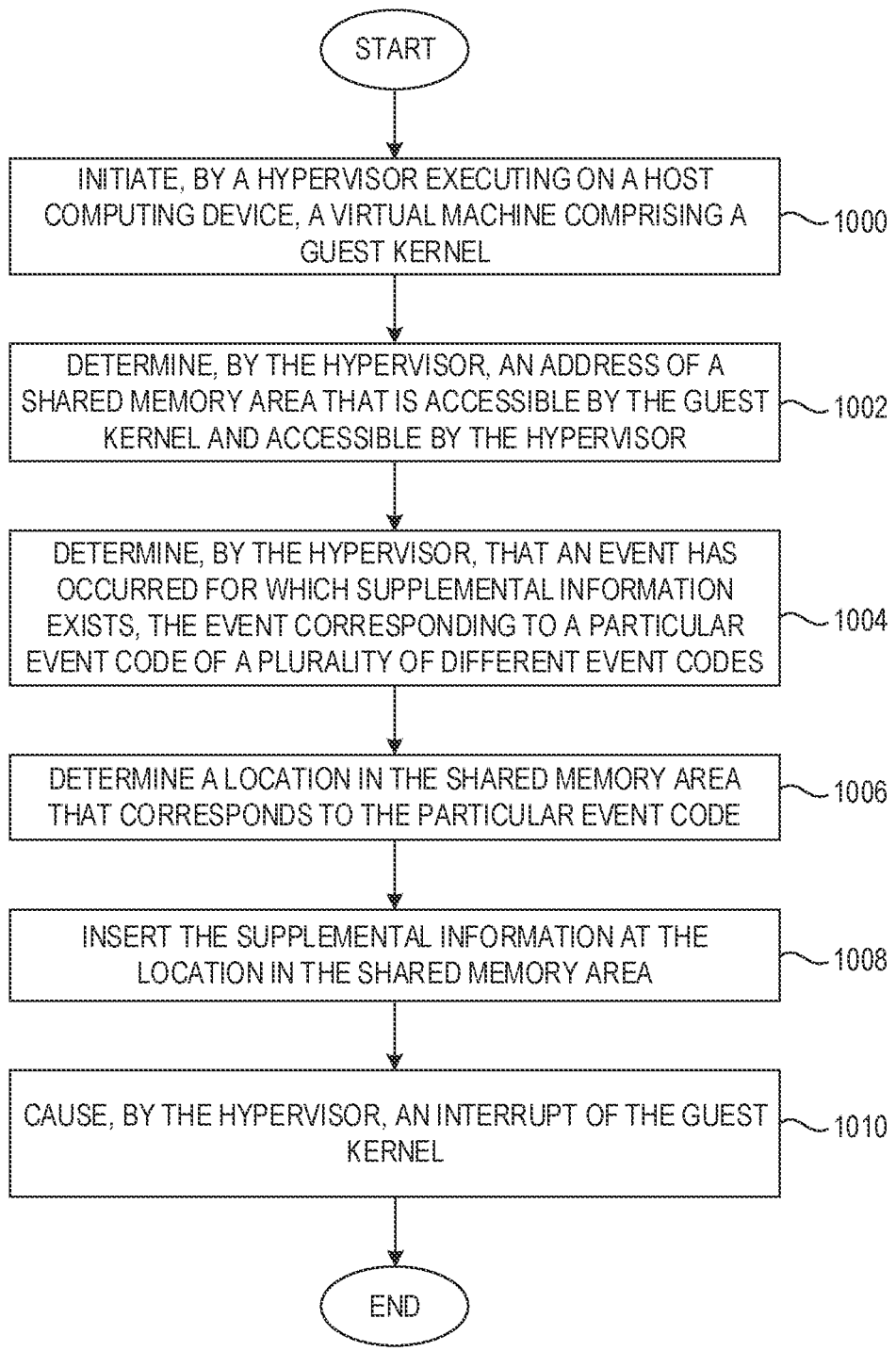
FIG. 2 is a flowchart of a mechanism for providing supplemental information to a guest operating system by a hypervisor according to one example.

FIG. 2 is a flowchart of a mechanism for providing supplemental information to a guest kernel by a hypervisor according to one example. FIG. 2 will be discussed in conjunction with FIG. 1. The hypervisor 20 initiates the VM 32 comprising the guest kernel 38 (FIG. 2, block 1000). The hypervisor 20 determines an address of the shared memory area 40 that is accessible by the guest kernel 38 and accessible by the hypervisor 20 (FIG. 2, block 1002). The hypervisor 20 determines that an event has occurred for which supplemental information exists, the event corresponding to a particular event code of a plurality of different event codes (FIG. 2, block 1004). The hypervisor 20 determines a location in the shared memory area 40 that corresponds to the particular event code (FIG. 2, block 1006). The hypervisor 20 inserts the supplemental information at the location in the shared memory area 40 (FIG. 2, block 1008). The hypervisor 20 causes an interrupt of the guest kernel 38 (FIG. 2, block 1010).

Figure 3:
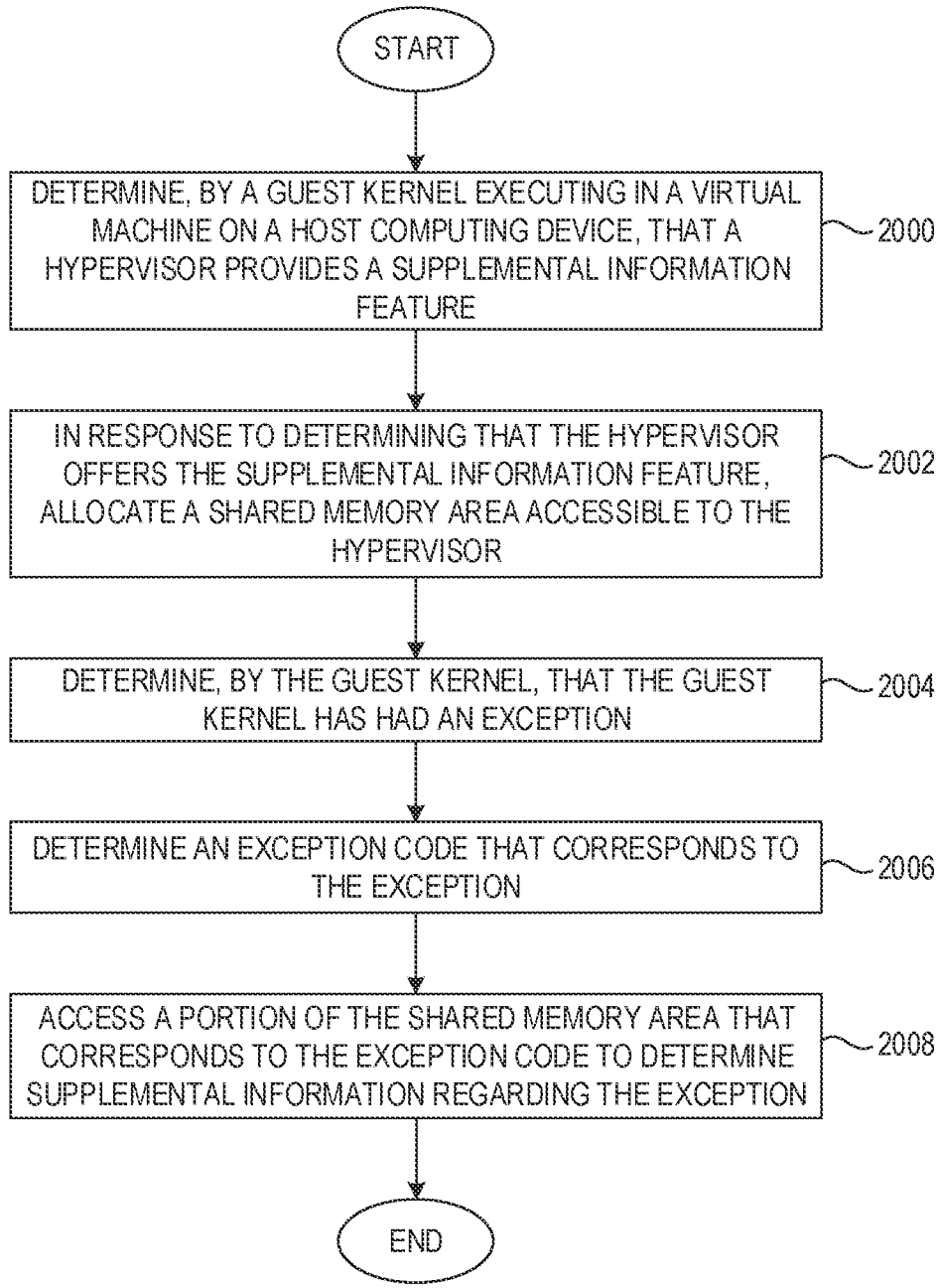
FIG. 3 is a flowchart of a mechanism for receiving supplemental information by a guest kernel from a hypervisor according to one example.

FIG. 3 is a flowchart of a mechanism for receiving supplemental information by a guest kernel from a hypervisor according to one example. FIG. 3 will be discussed in conjunction with FIG. 1. The guest kernel 38 determines that the hypervisor 20 provides a supplemental information feature (FIG. 3, block 2000). The guest kernel 38, in response to determining that the hypervisor 20 offers the supplemental information feature, allocates the shared memory area 40 accessible to the hypervisor 20 (FIG. 3, block 2002). The guest kernel 38 determines that the guest kernel 38 has had an exception (FIG. 3, block 2004). The guest kernel 38 determines an exception code that corresponds to the exception (FIG. 3, block 2006). The guest kernel 38 accesses a portion of the shared memory area 40 that corresponds to the exception code to determine supplemental information regarding the exception (FIG. 3, block 2008).

Figure 4:
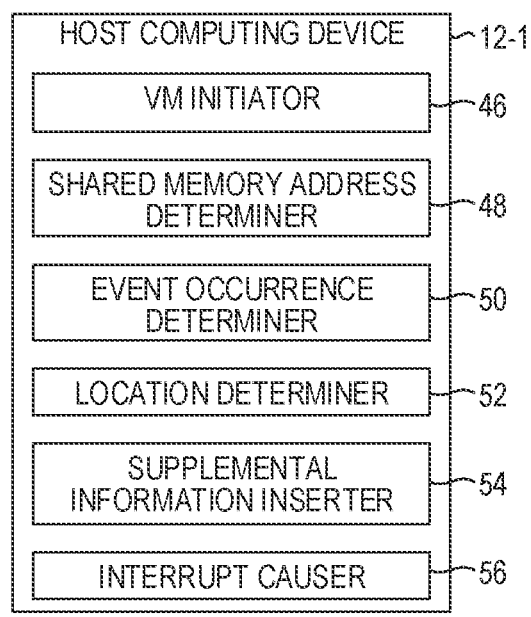
FIG. 4 is a block diagram of a host computing device suitable for implementing aspects illustrated in FIGS. 1-3 according to one implementation.

FIG. 4 is a block diagram of a host computing device 12-1 according to another implementation. The host computing device 12-1 implements identical functionality as that described above with regard to the host computing device 12. The host computing device 12-1 includes a VM initiator 46 that is to initiate, via the hypervisor 20, the virtual machine 32 that includes the guest kernel 38. The VM initiator 46 may comprise executable software instructions to program a processor device to implement the functionality of initiating, via the hypervisor 20, the virtual machine 32 that includes the guest kernel 38, may comprise circuitry including, by way of non-limiting example, an application-specific integrated circuit (ASIC), field-programmable gate array (FPGA), or may comprise a combination of executable software instructions and circuitry.

The host computing device 12-1 also includes a shared memory address determiner 48 that is to determine the address of the shared memory area 40 that is accessible by the guest kernel 38 and accessible by the hypervisor 20. The shared memory address determiner 48 may comprise executable software instructions to implement the functionality of determining the address of the shared memory area 40 that is accessible by the guest kernel 38 and accessible by the hypervisor 20, may comprise circuitry including, by way of non-limiting example, an ASIC, FPGA, or may comprise a combination of executable software instructions and circuitry.

The host computing device 12-1 also includes an event occurrence determiner 50 that is to determine, via the hypervisor 20, that an event has occurred for which supplemental information exists. The event occurrence determiner 50 may comprise executable software instructions to program a processor device to implement the functionality of determining, via the hypervisor 20, that an event has occurred for which supplemental information exists, may comprise circuitry including, by way of non-limiting example, an ASIC, FPGA, or may comprise a combination of executable software instructions and circuitry.

The host computing device 12-1 also includes a location determiner 52 that is to determine a location in the shared memory area 40 that corresponds to the particular event code. The location determiner 52 may comprise executable software instructions to program a processor device to implement the functionality of determining a location in the shared memory area 40 that corresponds to the particular event code, may comprise circuitry including, by way of non-limiting example, an ASIC, FPGA, or may comprise a combination of executable software instructions and circuitry.

The host computing device 12-1 also includes a supplemental information inserter 54 that is to insert the supplemental information at the location in the shared memory area 40. The supplemental information inserter 54 may comprise executable software instructions to program a processor device to implement the functionality of inserting the supplemental information at the location in the shared memory area 40, may comprise circuitry including, by way of non-limiting example, an ASIC, FPGA, or may comprise a combination of executable software instructions and circuitry.

The host computing device 12-1 also includes an interrupt causer 56 that is to cause, via the hypervisor 20, an interrupt of the guest kernel 38. The interrupt causer 56 may comprise executable software instructions to program a processor device to implement the functionality of causing, via the hypervisor 20, an interrupt of the guest kernel 38, may comprise circuitry including, by way of non-limiting example, an ASIC, FPGA, or may comprise a combination of executable software instructions and circuitry.

Figure 5:
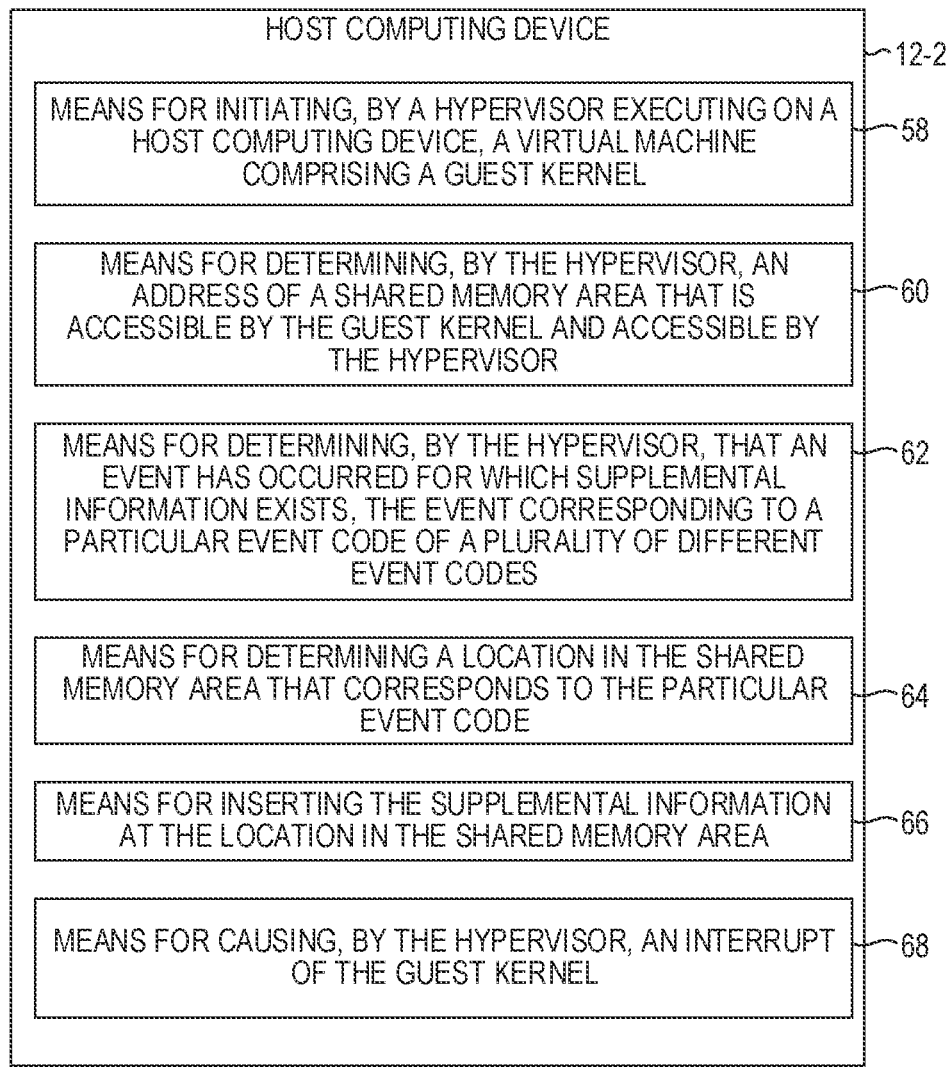
FIG. 5 is a block diagram of a host computing device according to additional implementations.

FIG. 5 is a block diagram of a host computing device 12-2 according to additional implementations. The host computing device 12-2 implements identical functionality as that described above with regard to the host computing device 12. In this implementation, the host computing device 12-2 includes a means 58 for means for initiating, by the hypervisor 20 executing on the host computer 12-2, the virtual machine 32 comprising the guest kernel 38. The means 58 may be implemented in any number of manners, including, for example, via the VM initiator 46 illustrated in FIG. 4. The host computing device 12-2 also includes a means 60 for determining, by the hypervisor 20, an address of the shared memory area 40 that is accessible by the guest kernel 38 and accessible by the hypervisor 20. The means 60 may be implemented in any number of manners, including, for example, via the shared memory address determiner 48 illustrated in FIG. 4. In some examples, the means 60 may comprise receiving the address of the shared memory area 40 from the guest kernel 38 via a hypercall. In other examples, the means 60 may comprise accessing a predetermined memory location, such as a register, where the guest kernel 38 stored the address of the shared memory area 40.

The host computing device 12-2 also includes a means 62 for determining, by the hypervisor 20, that an event has occurred for which supplemental information exists, the event corresponding to a particular event code of a plurality of different event codes. The means 62 may be implemented in any number of manners, including, for example, via the event occurrence determiner 50 illustrated in FIG. 4. The host computing device 12-2 also includes a means 64 for determining a location in the shared memory area 40 that corresponds to the particular event code. The means 64 may be implemented in any number of manners, including, for example, via the location determiner 52 illustrated in FIG. 4. In some examples, the means 64 may comprise accessing the event code offset information 26.

The host computing device 12-2 also includes a means 66 for inserting the supplemental information at the location in the shared memory area 40. The means 66 may be implemented in any number of manners, including, for example, via the supplemental information inserter 54 illustrated in FIG. 4. The host computing device 12-2 also includes a means 68 for causing, by the hypervisor 20, an interrupt of the guest kernel 38. The means 68 may be implemented in any number of manners, including, for example, via the interrupt causer 56 illustrated in FIG. 4.

Figure 6:
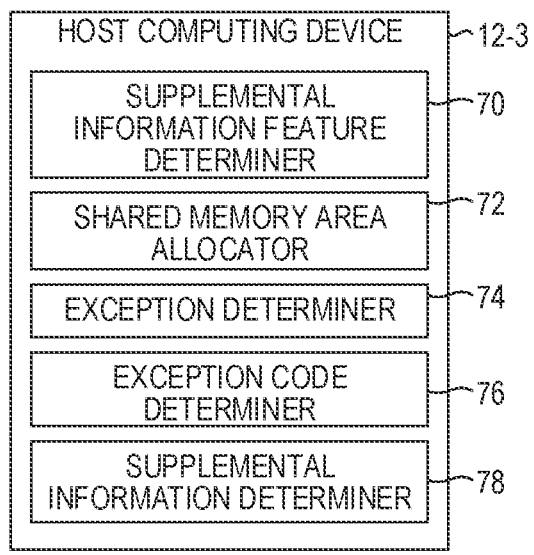
FIG. 6 is a block diagram of a host computing device suitable for implementing aspects illustrated in FIGS. 1-3 according to another implementation.

FIG. 6 is a block diagram of a host computing device 12-3 according to another implementation. The host computing device 12-3 implements identical functionality as that described above with regard to the host computing device 12. The host computing device 12-3 includes a supplemental information feature determiner 70 that is to determine, by the guest kernel 38 executing in the virtual machine 32 on the host computing device 12-3, that the hypervisor 20 provides a supplemental information feature. The supplemental information feature determiner 70 may comprise executable software instructions to program a processor device to implement the functionality of determining, by the guest kernel 38 executing in the virtual machine 32 on the host computing device 12-3, that the hypervisor 20 provides a supplemental information feature, may comprise circuitry including, by way of non-limiting example, an application-specific integrated circuit (ASIC), field-programmable gate array (FPGA), or may comprise a combination of executable software instructions and circuitry.

The host computing device 12-3 also includes a shared memory area allocator 72 that is to, in response to determining that the hypervisor 20 offers the supplemental information feature, allocate the shared memory area 40 accessible to the hypervisor 20. The shared memory area allocator 72 may comprise executable software instructions to implement the functionality of, in response to determining that the hypervisor 20 offers the supplemental information feature, allocate the shared memory area 40 accessible to the hypervisor 20, may comprise circuitry including, by way of non-limiting example, an ASIC, FPGA, or may comprise a combination of executable software instructions and circuitry.

The host computing device 12-3 also includes an exception determiner 74 that is to determine, by the guest kernel 38, that the guest kernel 38 has had an exception. The exception determiner 74 may comprise executable software instructions to program a processor device to implement the functionality of determining, by the guest kernel 38, that the guest kernel 38 has had an exception, may comprise circuitry including, by way of non-limiting example, an ASIC, FPGA, or may comprise a combination of executable software instructions and circuitry.

The host computing device 12-3 also includes an exception code determiner 76 that is to determine an exception code that corresponds to the exception. The exception code determiner 76 may comprise executable software instructions to program a processor device to implement the functionality of determining an exception code that corresponds to the exception, may comprise circuitry including, by way of non-limiting example, an ASIC, FPGA, or may comprise a combination of executable software instructions and circuitry. The host computing device 12-3 also includes a supplemental information determiner 78 that is to access a portion of the shared memory area 40 that corresponds to the exception code to determine supplemental information regarding the exception. The supplemental information determiner 78 may comprise executable software instructions to program a processor device to implement the functionality of accessing a portion of the shared memory area that corresponds to the exception code to determine supplemental information regarding the exception, may comprise circuitry including, by way of non-limiting example, an ASIC, FPGA, or may comprise a combination of executable software instructions and circuitry.

Figure 7:
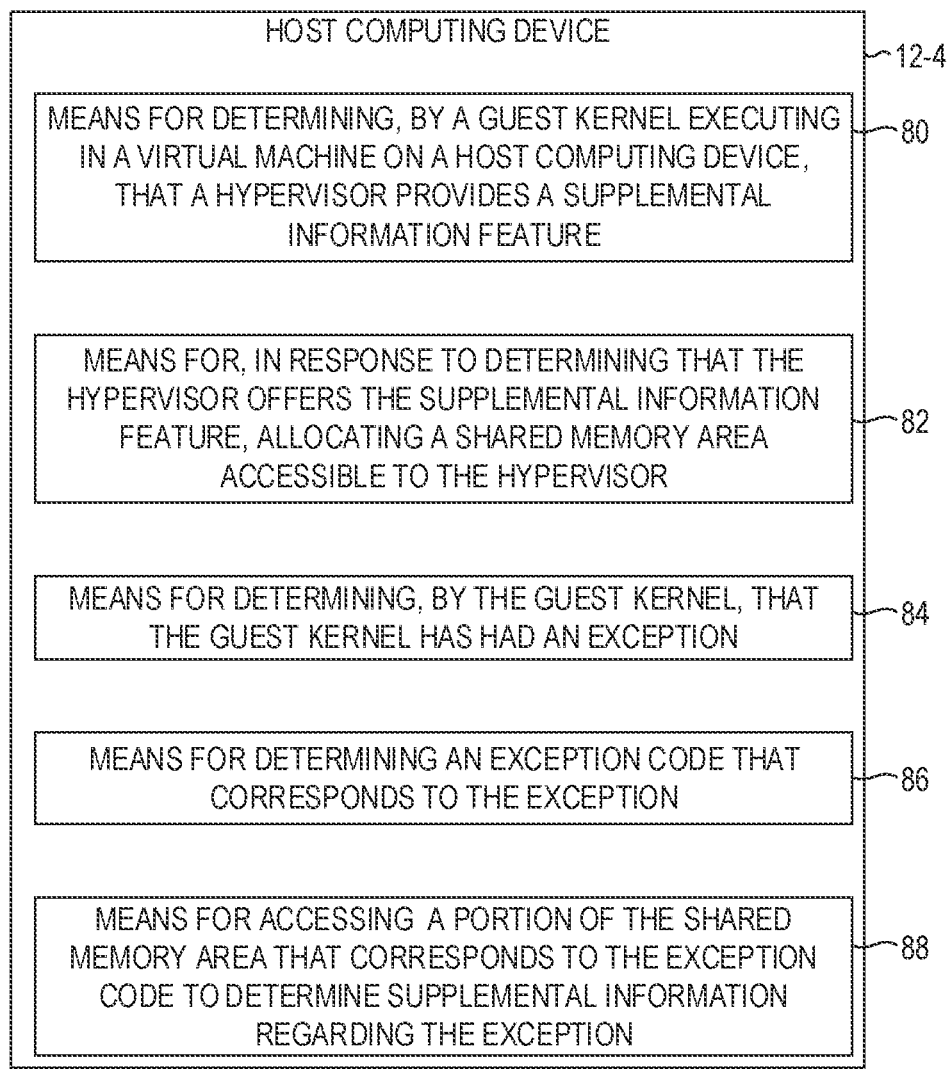
FIG. 7 is a block diagram of a host computing device according to additional implementations.

FIG. 7 is a block diagram of a host computing device 12-4 according to additional implementations. The host computing device 12-4 implements identical functionality as that described above with regard to the host computing device 12. In this implementation, the host computing device 12-4 includes a means 80 for determining, by the guest kernel 38 executing in the virtual machine 32 on the host computing device 12-4, that the hypervisor 20 provides a supplemental information feature. The means 80 may be implemented in any number of manners, including, for example, via the supplemental information feature determiner 70 illustrated in FIG. 6. The host computing device 12-4 also includes a means 82 for, in response to determining that the hypervisor 20 offers the supplemental information feature, allocating the shared memory area 40 accessible to the hypervisor 20. The means 82 may be implemented in any number of manners, including, for example, via the shared memory area allocator 72 illustrated in FIG. 6.

The host computing device 12-4 also includes a means 84 for determining, by the guest kernel 38, that the guest kernel 38 has had an exception. The means 84 may be implemented in any number of manners, including, for example, via the exception determiner 74 illustrated in FIG. 6. The host computing device 12-4 also includes a means 86 for determining an exception code that corresponds to the exception. The means 86 may be implemented in any number of manners, including, for example, via the exception code determiner 76 illustrated in FIG. 6. The host computing device 12-4 also includes a means 88 for accessing a portion of the shared memory area 40 that corresponds to the exception code to determine supplemental information regarding the exception. The means 88 may be implemented in any number of manners, including, for example, via the supplemental information determiner 78 illustrated in FIG. 6.

Figure 8:
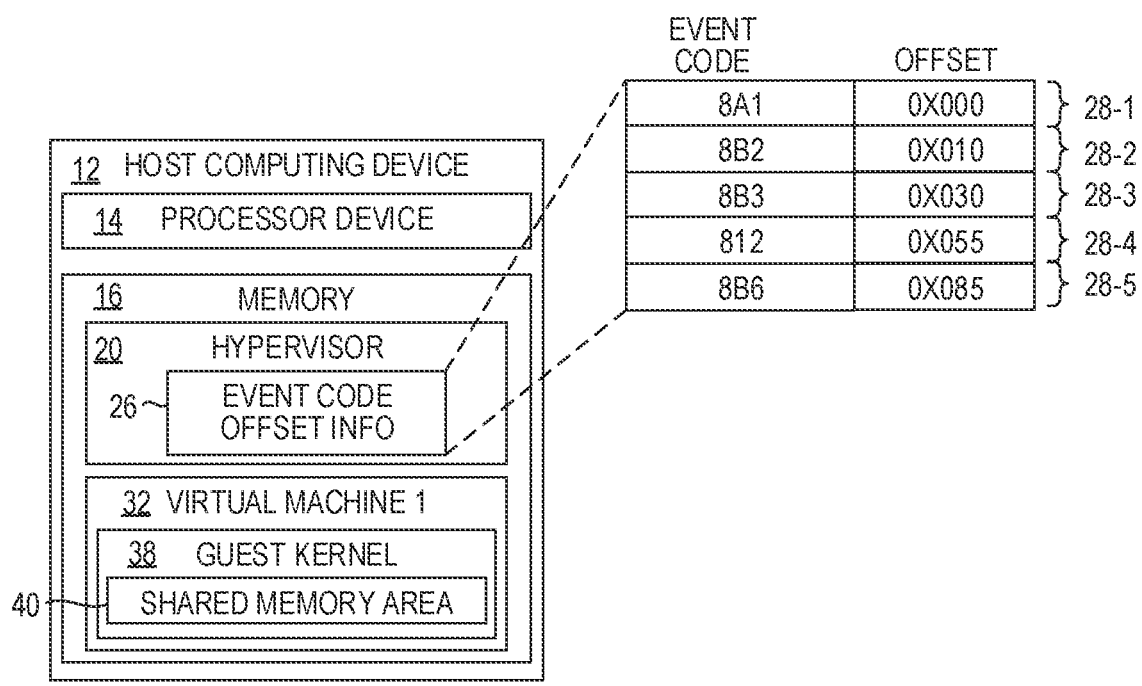
FIG. 8 is a simplified block diagram of the environment illustrated in FIG. 1.

FIG. 8 is a simplified block diagram of the environment 10 illustrated in FIG. 1. The host computing device 12 includes the memory 16 and the processor device 14 coupled to the memory 16. The processor device 14 is to initiate, by the hypervisor 20, the virtual machine 32 including the guest kernel 38. The processor device 14 is to determine the address of the shared memory area 40 that is accessible by the guest kernel 38. The processor device 14 is to determine, by the hypervisor 20, that an event has occurred for which supplemental information exists, the event corresponding to an event code. The processor device 14 is to determine a location in the shared memory area 40 that corresponds to the particular event code. The processor device 14 is to insert the supplemental information at the location in the shared memory area 40. The processor device 14 is to cause, by the hypervisor 20, an interrupt of the guest kernel 38.

Figure 9:
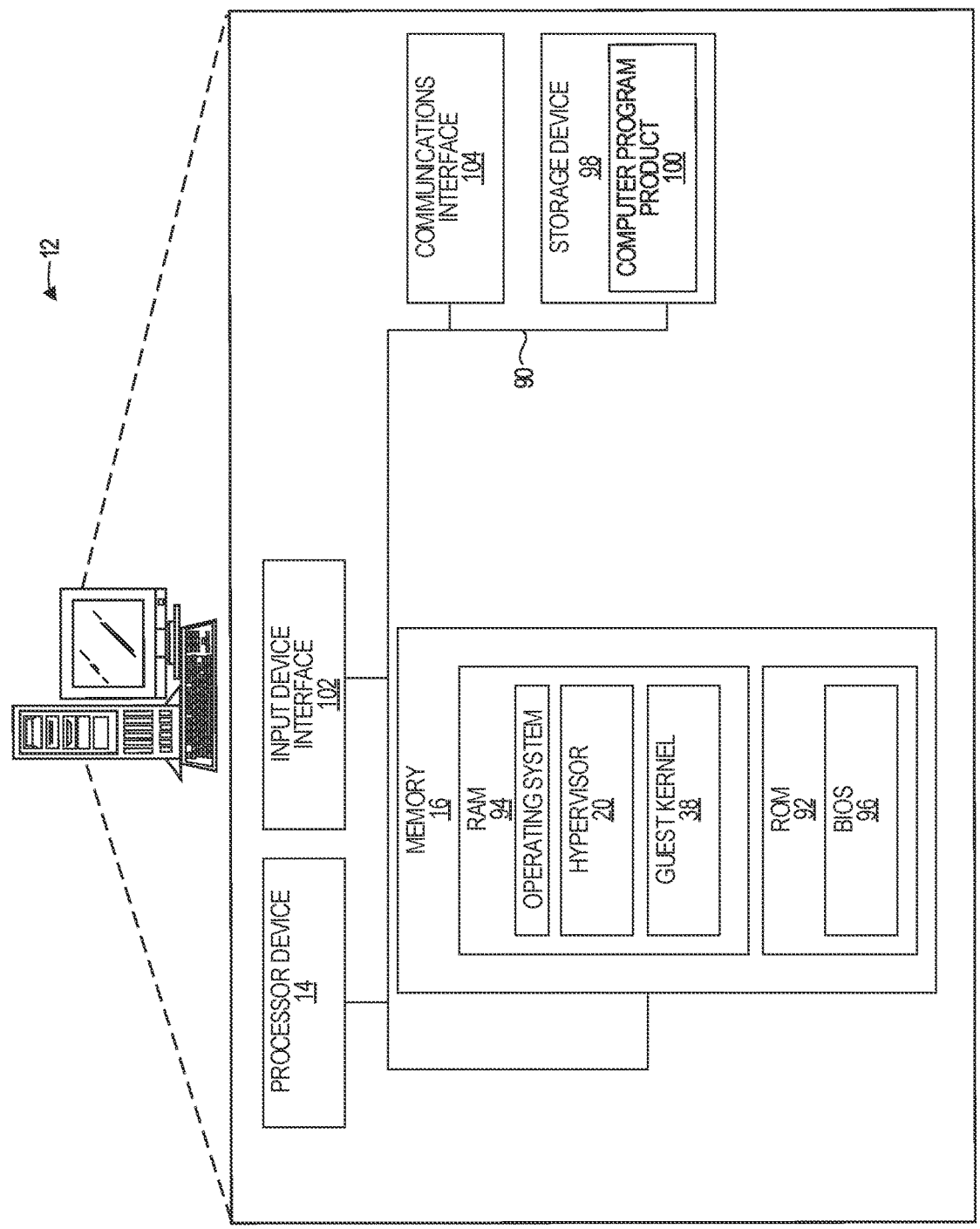
FIG. 9 is a block diagram of a host computing device suitable for implementing examples disclosed herein.

FIG. 9 is a block diagram of the host computing device 12 suitable for implementing examples according to one example. The host computing device 12 may comprise any computing or electronic device capable of including firmware, hardware, and/or executing software instructions to implement the functionality described herein, such as a computer server, a desktop computing device, or the like. The host computing device 12 includes the processor device 14, the system memory 16, and a system bus 90. The system bus 90 provides an interface for system components including, but not limited to, the system memory 16 and the processor device 14. The processor device 14 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The system memory 16 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the host computing device 12. The volatile memory 94 may also include a high-speed RAM, such as static RAM, for caching data.

The host computing device 12 may further include or be coupled to a non-transitory computer-readable storage medium such as a storage device 98, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 98 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 98 and in the volatile memory 94, including an operating system and one or more program modules, such as the hypervisor 20 and the guest kernel 38, which may implement the functionality described herein in whole or in part. All or a portion of the examples may be implemented as a computer program product 100 stored on a transitory or non-transitory computer-usable or computer-readable storage medium, such as the storage device 98, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the hypervisor 20 and the guest kernel 38 in the volatile memory 94, may serve as a controller, or control system, for the host computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 102 that is coupled to the system bus 90 but can be connected by other interfaces such as a parallel port, an Institute of Electrical and Electronic Engineers (IEEE) 1394 serial port, a Universal Serial Bus (USB) port, an IR interface, and the like. The host computing device 12 may also include a communications interface 104, such as an Ethernet transceiver, suitable for communicating with a network as appropriate or desired.

Other computer system designs and configurations may also be suitable to implement the systems and methods described herein. The following examples illustrate various additional implementations in accordance with one or more aspects of the disclosure.

Example 1 is a method that includes determining, by a guest kernel executing in a virtual machine on a host computing device, that a hypervisor provides a supplemental information feature; in response to determining that the hypervisor offers the supplemental information feature, allocating a shared memory area accessible to the hypervisor; determining, by the guest kernel, that the guest kernel has had an exception; determining an exception code that corresponds to the exception; and accessing a portion of the memory area that corresponds to the exception code to determine supplemental information regarding the exception.

Example 2 is the method of example 1 further comprising clearing the supplemental information from the memory area.

Example 3 is the method of example 1 further comprising providing, to the hypervisor, a memory address location that identifies the location of the shared memory area.

Example 4 is the method of example 3 wherein providing the memory address location comprises writing, to a predetermined memory location, the memory address location that identifies the location of the shared memory area.

Example 5 is the method of example 1 wherein determining that the hypervisor provides the supplemental information feature includes accessing a value at a predetermined memory location; and determining that the hypervisor provides the supplemental information feature based on the value.

Example 6 is the method of example 1 wherein accessing the portion of the memory area that corresponds to the exception code to determine supplemental information regarding the exception further includes accessing a data structure that correlates a plurality of exception codes to a corresponding plurality of offset values; determining a particular offset value that corresponds to the exception code; and adding the particular offset value to a memory address of the location of the shared memory area.

Example 7 is the method of example 1 wherein the supplemental information indicates that the host computing device has an idle processor device, and further including, based on the supplemental information, initiating, by the guest kernel, a process.

Example 8 is the method of example 1 wherein the supplemental information indicates that a performance monitoring unit (PMU) model specific register (MSR) is not exposed to the guest kernel and further including, based on the supplemental information, inhibiting subsequent attempts to access the PMU MSR.

Example 9 is the method of example 1 wherein the supplemental information indicates a port of the host computing device, and further including, based on the supplemental information, inhibiting subsequent attempts to access the port.

Example 10 is the method of example 1 wherein the supplemental information indicates that a power saving instruction is not implemented by the hypervisor, and further including, based on the supplemental information, performing a pause or halt instruction in lieu of the power saving instruction.

Example 11 is a computing device including means for determining, by a guest kernel executing in a virtual machine on a computing device, that a hypervisor provides a supplemental information feature; means for, in response to determining that the hypervisor offers the supplemental information feature, allocating a shared memory area accessible to the hypervisor; means for determining, by the guest kernel, that the guest kernel has had an exception; means for determining an exception code that corresponds to the exception; and means for accessing a portion of the shared memory area that corresponds to the exception code to determine supplemental information regarding the exception.

Example 12 is a computing device including a supplemental information feature determiner to determine, by a guest kernel executing in a virtual machine on a computing device, that a hypervisor provides a supplemental information feature; a shared memory area allocator to, in response to determining that the hypervisor offers the supplemental information feature, allocate a shared memory area accessible to the hypervisor; an exception determiner to determine, by the guest kernel, that the guest kernel has had an exception; an exception code determiner to determine an exception code that corresponds to the exception; and a memory area accessor to access a portion of the memory area that corresponds to the exception code to determine supplemental information regarding the exception.

Example 13 is a computing device including a memory; and a processor device coupled to the memory to: determine, by a guest kernel executing in a virtual machine on a computing device, that a hypervisor provides a supplemental information feature; in response to determining that the hypervisor offers the supplemental information feature, allocate a shared memory area accessible to the hypervisor; determine, by the guest kernel, that the guest kernel has had an exception; determine an exception code that corresponds to the exception; and access a portion of the memory area that corresponds to the exception code to determine supplemental information regarding the exception.

Example 14 is a non-transitory computer-readable storage medium that includes executable instructions to cause a processor device to: determine, by a guest kernel executing in a virtual machine on a computing device, that a hypervisor provides a supplemental information feature; in response to determining that the hypervisor offers the supplemental information feature, allocate a shared memory area accessible to the hypervisor; determine, by the guest kernel, that the guest kernel has had an exception; determine an exception code that corresponds to the exception; and access a portion of the shared memory area that corresponds to the exception code to determine supplemental information regarding the exception.

Example 15 is a computing device including means for initiating, by a hypervisor executing on a host computer, a virtual machine comprising a guest kernel; means for determining, by the hypervisor, an address of a shared memory area that is accessible by the guest kernel and accessible by the hypervisor; means for determining, by the hypervisor, that an event has occurred for which supplemental information exists, the event corresponding to a particular event code of a plurality of different event codes; means for determining a location in the shared memory area that corresponds to the particular event code; means for inserting the supplemental information at the location in the shared memory area; and means for causing, by the hypervisor, an interrupt of the guest kernel.

Example 16 is a computing device including a virtual machine initiator to initiate, by a hypervisor executing on a host computer, a virtual machine comprising a guest kernel; a shared memory area determiner to determine, by the hypervisor, an address of a shared memory area that is accessible by the guest kernel and accessible by the hypervisor; an event occurrence determiner to determine, by the hypervisor, that an event has occurred for which supplemental information exists, the event corresponding to a particular event code of a plurality of different event codes; a location determiner to determine a location in the shared memory area that corresponds to the particular event code; a supplemental information inserter to insert the supplemental information at the location in the shared memory area; and an interrupt causer to cause, by the hypervisor, an interrupt of the guest kernel.

Individuals will recognize improvements and modifications to the preferred examples of the disclosure. All such improvements and modifications are considered within the scope of the concepts disclosed herein and the claims that follow.

What is claimed is:

1. A method comprising:
    initiating, by a hypervisor executing on a host computing device, a virtual machine comprising a guest kernel;
    determining, by the hypervisor, an address of a shared memory area that is accessible by the guest kernel;
    determining, by the hypervisor, that an event has occurred for which supplemental information exists, the event corresponding to a particular event code of a plurality of different event codes by:
        accessing a supplemental information data structure that correlates the plurality of different event codes to corresponding supplemental information codes; and
        determining that the supplemental information data structure indicates that supplemental information exists for the particular event code;
    determining a location in the shared memory area that corresponds to the particular event code;
    inserting the supplemental information at the location in the shared memory area; and
    causing, by the hypervisor, an interrupt of the guest kernel.

2. The method of claim 1 further comprising storing, by the hypervisor in a predetermined memory location accessible to the guest kernel, a value that indicates that the hypervisor offers a supplemental information feature.

3. The method of claim 1 wherein determining the address of the shared memory area comprises accessing, by the hypervisor, a predetermined memory location where the guest kernel has stored the address of the shared memory area.

4. The method of claim 1 wherein determining the location in the shared memory area that corresponds to the particular event code comprises:
    accessing a data structure that correlates the plurality of different event codes to a corresponding plurality of offset values; and
    adding an offset value that corresponds to the particular event code to a memory address of the location in the shared memory area.

5. The method of claim 1 wherein determining, by the hypervisor, that the event has occurred for which the supplemental information exists further comprises:
    determining, by the hypervisor, that control has been transferred from the guest kernel to the hypervisor in response to an exception condition caused by the guest kernel; and
    determining an exception code for the exception condition, wherein the particular event code comprises the exception code.

6. The method of claim 5 further comprising based on the exception code, determining a supplemental information code that corresponds to the exception code, wherein the supplemental information comprises the supplemental information code.

7. The method of claim 5 wherein the exception code is caused by an attempt by the guest kernel to access a performance monitoring unit (PMU) model specific register (MSR) that is not exposed to the guest kernel.

8. The method of claim 7 wherein the supplemental information comprises information that indicates the PMU MSR is not exposed to the guest kernel.

9. The method of claim 5 wherein the exception code is caused by an attempt by the guest kernel to access a port that does not exist.

10. The method of claim 9 wherein the supplemental information comprises information that indicates that the port does not exist.

11. The method of claim 5 wherein the exception code is caused by the guest kernel attempting to execute a power saving instruction.

12. The method of claim 11 wherein the supplemental information comprises information that indicates that the hypervisor does not implement the power saving instruction.

13. The method of claim 1 wherein determining, by the hypervisor, that the event has occurred for which the supplemental information exists further comprises:
    determining that a condition of the host computing device exists, wherein the particular event code corresponds to a host condition event code, and wherein the supplemental information identifies the condition of the host computing device.

14. The method of claim 13 wherein the condition of the host computing device comprises an idle processor condition.

15. The method of claim 13 wherein the condition of the host computing device comprises a host shutting down condition.

16. A host computing device, comprising:
    a memory; and
    a processor device coupled to the memory to:
        initiate, by a hypervisor, a virtual machine comprising a guest kernel;

determine, by the hypervisor, an address of a shared memory area that is accessible by the guest kernel;

determine, by the hypervisor, that an event has occurred for which supplemental information exists, the event corresponding to a particular event code of a plurality of different event codes by:

accessing a supplemental information data structure that correlates the plurality of different event codes to corresponding supplemental information codes; and determining that the supplemental information data structure indicates that supplemental information exists for the particular event code;

determine a location in the shared memory area that corresponds to the particular event code;

insert the supplemental information at the location in the shared memory area; and cause, by the hypervisor, an interrupt of the guest kernel.

17. The host computing device of claim 16 wherein to determine, by the hypervisor, that the event has occurred for which the supplemental information exists, the processor device is further to:

determine, by the hypervisor, that control has been transferred from the guest kernel to the hypervisor in response to an exception condition caused by the guest kernel; and determine an exception code for the exception condition, wherein the particular event code comprises the exception code.

18. A non-transitory computer-readable storage medium that includes executable instructions to cause a processor device to:

initiate, by a hypervisor, a virtual machine comprising a guest kernel;

determine, by the hypervisor, an address of a shared memory area that is accessible by the guest kernel;

determine, by the hypervisor, that an event has occurred for which supplemental information exists, the event corresponding to a particular event code of a plurality of different event codes by:

accessing a supplemental information data structure that correlates the plurality of different event codes to corresponding supplemental information codes; and determining that the supplemental information data structure indicates that supplemental information exists for the particular event code;

determine a location in the shared memory area that corresponds to the particular event code;

insert the supplemental information at the location in the shared memory area; and cause, by the hypervisor, an interrupt of the guest kernel.

* * * * *